United States Patent [19]

Hamasaki

[11] 4,162,383
[45] Jul. 24, 1979

[54] OXY-ARC APPARATUS FOR CUTTING INSIDE A PIPE

[75] Inventor: Masanobu Hamasaki, Takamatsu, Japan

[73] Assignee: Agency of Industrial Science & Technology, Tokyo, Japan

[21] Appl. No.: 753,472

[22] Filed: Dec. 22, 1976

[30] Foreign Application Priority Data

Dec. 24, 1975 [JP] Japan .............................. 50-155649

[51] Int. Cl.² .............................................. B23P 1/00
[52] U.S. Cl. .................................. 219/68; 219/125.11; 266/55
[58] Field of Search .......... 219/125 R, 68, 66, 125.11; 266/54, 55

[56] References Cited

U.S. PATENT DOCUMENTS

| | | | |
|---|---|---|---|
| 2,208,676 | 7/1940 | Kosman | 219/66 |
| 2,622,327 | 12/1952 | Halonen | 266/55 |
| 3,207,408 | 9/1965 | Thome et al. | 219/125 R |
| 3,612,808 | 10/1971 | Nelson | 219/125 R |

Primary Examiner—E. A. Goldberg
Attorney, Agent, or Firm—Oblon, Fisher, Spivak, McClelland & Maier

[57] ABSTRACT

Disclosed herein is a device for cutting a pipe from the inside by the oxy-arc cutting technique. This device comprises, in combination, guide means for guiding the device proper inside a pipe subjected to cutting, fixing means provided with a plurality of claws adapted to be thrust radially from a cylinder in the direction of the inner wall of the pipe by the action of a piston actuated by the supply of a compressed fluid to the cylinder so as to hold the device immovable in position inside the pipe, and oxy-arc cutting means for cutting the pipe from the inside by the use of a covered hollow stick cutting rod rotated by a rotary shaft pierced through the center of the piston, with the exposed core of the cutting rod held in sliding contact under a fixed force with the inner wall of the pipe.

6 Claims, 11 Drawing Figures

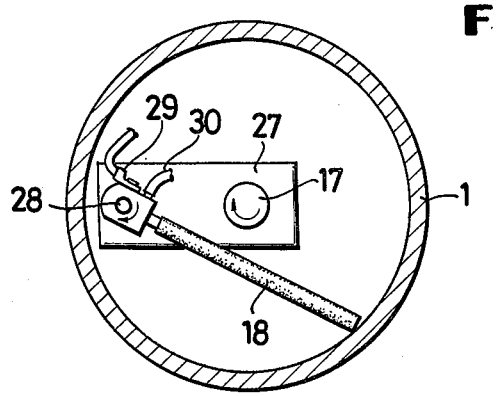
Fig. 7
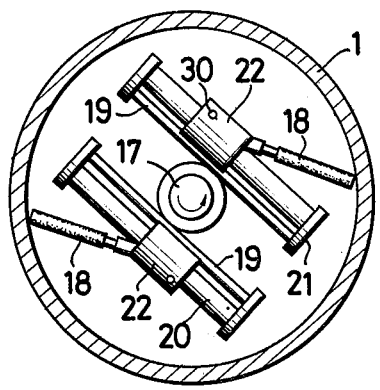
Fig. 8
(A)
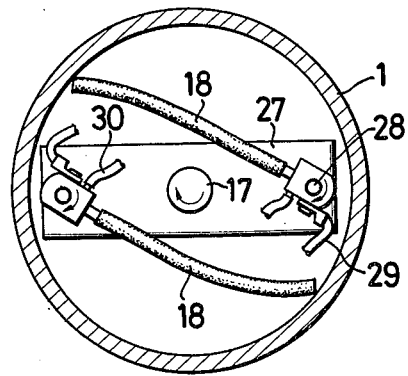
(B)

OXY-ARC APPARATUS FOR CUTTING INSIDE A PIPE

BACKGROUND OF THE INVENTION

1. Field of the Prior Art

The present invention relates to a device for cutting a pipe from the inside thereof by the oxy-arc cutting technique.

2. Description of the Prior Art

As one of the methods available for cutting steel, there can be cited the oxy-arc cutting method. This method uses a hollow stick electrode (hereinafter referred to as the "cutting rod") covered with a layer of flux serving the dual purpose of insulating the electrode from the work and stabilizing the arc, so that required cutting of a given work may be effected by generating an arc between the cutting rod and the work, then throwing a current of oxygen through the inner hole of the cutting rod and consequently cutting the work by utilizing the exothermic oxidation reaction caused between the steel and the oxygen. A short circuit would occur in the course of cutting if the underlying metal of the cutting rod should come into direct contact with the work. To avoid this trouble, the cutting rod is inclined at a fixed angle (less than 90°) with reference to the work and is at the same time held in contact under a fixed force with the work, so that an arc may be generated and kept at a fixed length while otherwise possible short circuit is prevented through the intervention of the layer of covering flux. Under these conditions, the cutting rod is passed along the line selected for cutting to effect the desired cutting of the pipe. Thus, the cutting operation can be easily carried out and can be readily automated.

By the oxy-arc cutting method described above, a given pipe can be cut from the outside. It is extremely difficult, however, to effect required cutting by this method on a pipe buried under ground or a pipe surrounded by many other pipes or structural materials.

SUMMARY OF THE INVENTION

An object of this invention is to provide a device which enables a pipe to be readily cut from the inside thereof at a desired position by the oxy-arc cutting technique described above.

To attain the object described above according to the present invention, there is provided a device which comprises, in combination, a cylinder internally incorporating a piston and downwardly extending into a circular skirt, a plurality of claws connected to the lower part of the piston and adapted to be radially thrust out in the direction of the inner wall of a pipe in consequence of the descent of the piston, a plurality of guide rollers protruding radially in the direction of the inner wall of the pipe, some of the rollers from the upper peripheral surface of said cylinder and others from the peripheral surface of the circular skirt, a rotary shaft pierced axially through the cylinder and the piston, with the upper end of said rotary shaft extended upwardly from the upper side of the cylinder and provided with means for driving the rotary shaft, and a cutting rod covered with a layer of flux and disposed in such a posture at the other end of the rotary shaft as to have the leading end thereof held in contact with the inner wall of the pipe at a fixed angle relative to said inner wall.

Since the device for cutting a pipe according to this invention has a construction as described above, the device can be fixed in position inside a pipe by inserting the cylinder in the pipe to a desired point and then supplying a compressed fluid to the cylinder for thereby causing the plurality of claws to be thrust out and pressed against the inner wall of the pipe. The pipe is fused from the inside by an arc formed by feeding oxygen to and applying an electric potential upon the cutting rod for thereby causing a flow of electric current and, with the device in such condition as described above, the required cutting of the pipe is easily effected by turning the rotary shaft one complete rotation by the driving means. By this device, therefore, desired cutting can be readily effected even on a pipe which is buried in soil or in concrete. By carrying out the steps of operation described above by use of automated sequential signals, the cutting can be obtained as easily on a pipe standing under water as on a pipe standing in the atmosphere.

BRIEF DESCRIPTION OF THE DRAWINGS

The other objects and characteristic features of the present invention will become apparent from the description to be given in detail hereinafter with reference to the accompanying drawings.

FIGS. 6 and 8(A) and 8(B) are bottom views illustrating other embodiments of the device for cutting a pipe according to the present invention.

Figure 1:
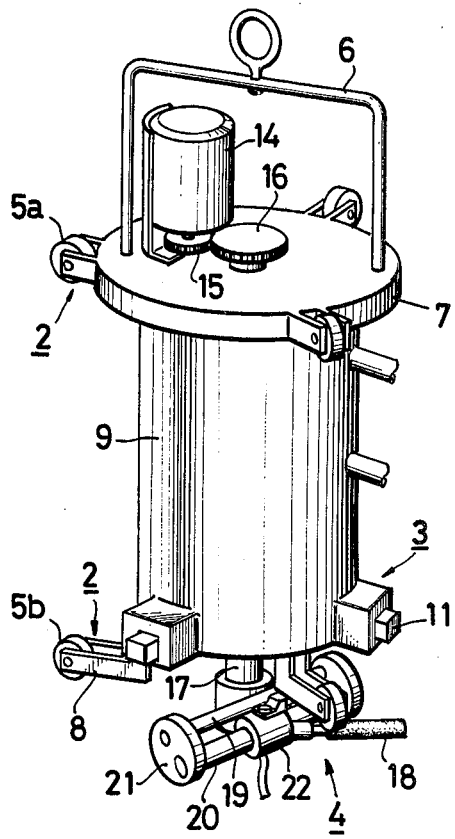
FIG. 1 is a perspective view of one preferred embodiment of the device for cutting a pipe according to the present invention.
Figure 2:
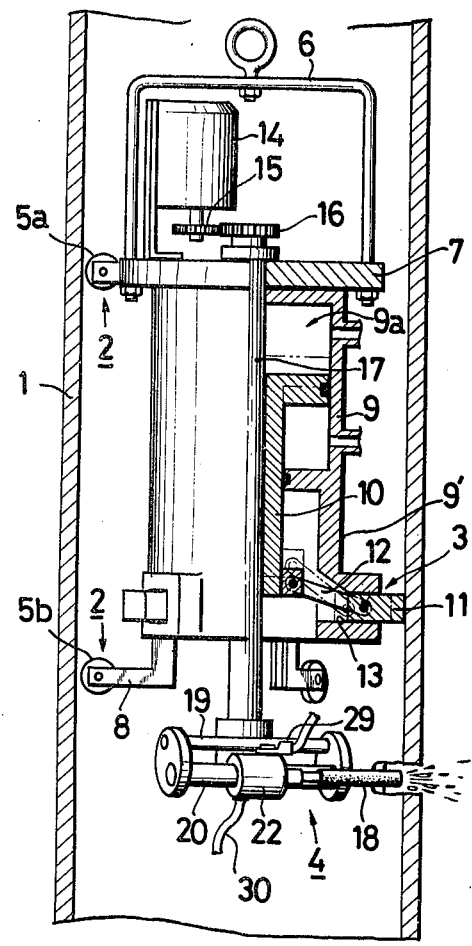
FIG. 2 is a partially sectioned side view of the device of FIG. 1.
Figure 3:
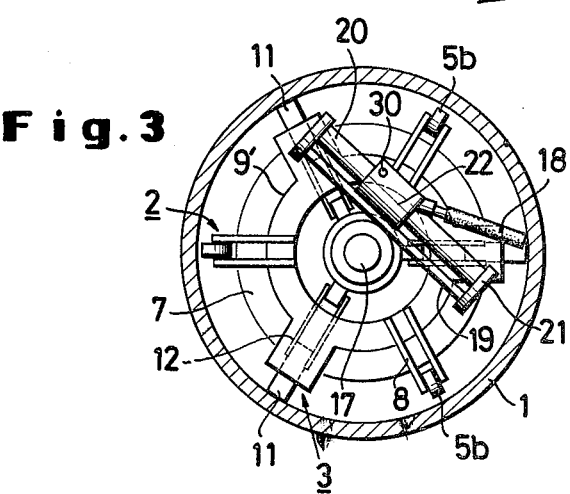
FIG. 3 is a bottom view of the device of FIG. 1.

DESCRIPTION OF THE PREFERRED EMBODIMENTS:

With reference to the accompanying drawings, the pipe cutting device of the present invention is such that it is lowered down into a given pipe until it reaches the predetermined point and then it is operated there to cut the pipe from the inside by the oxy-arc cutting technique. It, therefore, comprises guiding means 2 for causing the entire device to slide smoothly along the inner surface of a pipe 1, fixing means 3 for holding the device immovable in position inside the pipe 1 and oxy-arc cutting means 4 for cutting the pipe 1 from the inside.

The guiding means 2 comprises a plurality of guide rollers 5a disposed on the peripheral surface of a support plate 7 provided on the upper surface thereof with a suspending arm 6 and fixed to the upper surface of the cylinder 9 and a plurality of guide rollers 5b disposed at the forward ends of legs 8 radially protruding from the lower edge of a part 9' cylindrically extended from the lower end of the cylinder 9. When the device is suspended from the suspending arm 6 and lowered down inside the pipe, these guide rollers 5a, 5b serve the purpose of allowing the device to slide smoothly down the inner wall of the pipe 1. The length from the center of the cylinder to the leading tip of each guide roller is required to be smaller than the inside radius of the pipe 1 subjected to cutting. To keep the device from direct contact with the inner wall of the pipe 1, the number of guide rollers on the upper side or on the lower side is required to be at least three. The guide rollers 5a on the upper side need not necessarily correspond exactly in phase to the guide rollers 5b on the lower side. The device, therefore, can be applied to pipes of varying inside diameters when it is fitted with guide rollers of varying lengths in a detachable manner. In place of the supporting plate 7, the upper end of the cylinder 9 can be used in its unmodified form.

The fixing means 3 serving to hold the device immovable in position inside the pipe 1 comprises a cylinder 9 fixed coaxially to the lower surface of the supporting plate 7, a piston 10 actuated by the compressed fluid supplied to the cylinder 9 and a plurality of claws 11 radially disposed and connected to the lower end of the piston 10 through the media of links 12 so that they will be thrust out in the direction of the inner wall of the pipe 1 and then pressed against the inner wall of the pipe 1 to hold the device immovable in position relative to the pipe 1. Said plurality of claws 11 are fitted into guide apertures 13 disposed on the cylindrically extended skirt part 9' continuing into the lower part of the cylinder. While the device is hung down inside the pipe 1, the leading end of these claws are positioned inwardly of the guide rollers. When the device is to be fixed inside the pipe, the compressed fluid is supplied to an upper chamber 9a of the cylinder to lower the piston 10 and consequently cause the links 12 to thrust out the claws 11 radially through the guide apertures 13. As the claws 11 are further thrust out and finally pressed against the inner wall of the pipe 1, the device is fixed relative to the pipe 1. For this reason, the number of claws 11 disposed here is desired to be at least three. The level at which these claws 11 are thrust out should be between the level of the upper guide rollers 5a and the level of the lower guide rollers 5b. Desirably the claws 11 are detachably disposed, so that they can readily be replaced with claws of a varying length to suit the inside diameter of the particular pipe 1 subjected to cutting.

The oxy-arc cutting means 4 comprises a rotary shaft 17 pierced through the cylinder 9 and the piston 10, a rotary driven unit 14 provided with a speed reducing mechanism and connected through the media of gears 15, 16 over the supporting plate 7 to one end of the rotary shaft 17 so as to impart a rotary motion to the rotary shaft and a cutting rod 18 disposed at the lower end of the rotary shaft and adapted to be moved along the inner wall of the pipe with the leading end thereof pressed against the inner wall of the pipe.

To be more specific, a bar 19 is fastened perpendicularly to the rotary shaft 17 at the lower end of the rotary shaft. By means of two supporting discs 21 fastened one each at the opposite ends of the bar 19, a sliding bar 20 is held in position parallelly to the bar 19 at a fixed distance. Around this sliding bar 20, a moving base 22 holding the cutting rod 18 in position is slidably mounted so as to permit the cutting rod 18 to be moved along the inner wall of the pipe and be simultaneously held in contact under a fixed force with said inner wall. The cutting rod 18 is a hollow stick electrode the periphery of which is covered with flux. The force with which the cutting rod 18 is held against the inner wall of the pipe is in the range of from 2 to 12 kg where the diameter of the cutting rod is 5 to 12 mm and the thickness of the layer of flux is 1 to 2 mm. If the force of this contact is less than the lower limit 2 kg of the range, then the arc will have too great a length to remain intact. If it is greater than the upper limit 12 kg, then the layer of flux is crushed and the cutting rod is consequently brought into direct contact with the pipe, causing a short circuit. The moving base 22, therefore, must be moved toward the inner wall of the pipe in proportion as the consumption of the cutting rod increases.

Figure 4:
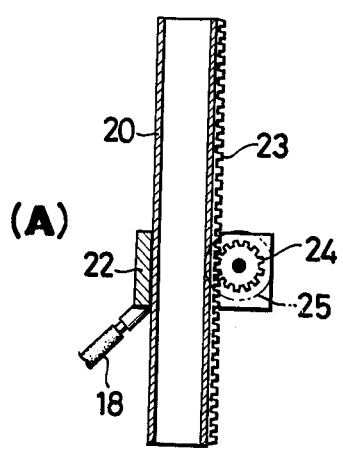
FIG. 4(A) is a sectional view of one embodiment of the mechanism for moving the cutting rod in the device for cutting a pipe according to the present invention.
FIG. 4(B) is a top view of FIG. 4(A)
Figure 5:
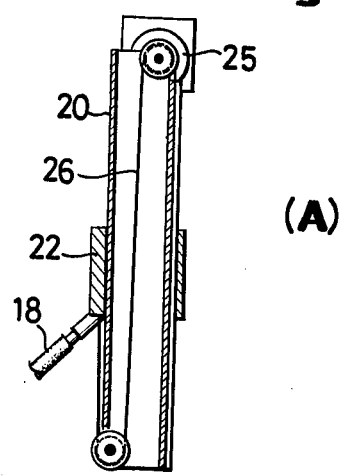
FIG. 5(A) is a sectional view of another embodiment of the mechanism for moving the cutting rod in the device for cutting a pipe according to the present invention.
FIG. 5(B) is a top view of FIG. 5(A)

This movement of the base 22 may be effected, for example, by a mechanism having a rack 23 disposed on the sliding bar 20 and a pinion 24 on the moving base 22, respectively, as illustrated in FIG. 4, or by a mechanism consisting of an air motor 25 disposed at one end of the moving base 22 and a wire 26 operated by the motor 25 to provide required dragging motion, as illustrated in FIG. 5. Otherwise, a spring or hydraulic mechanism may be employed for this purpose.

Figure 6:
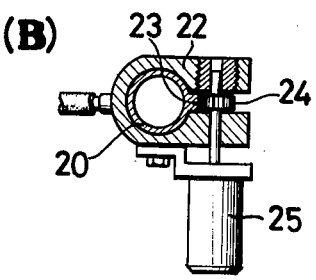
Figure 6:
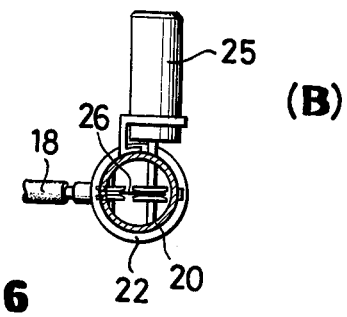
Figure 6:
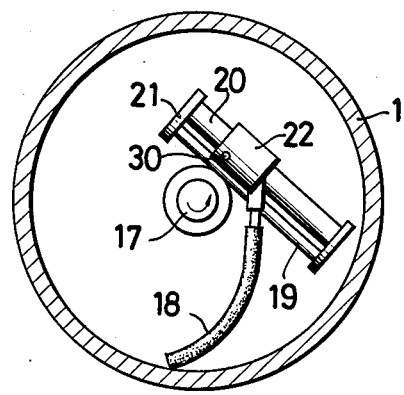

The angle at which the cutting rod is held in contact with the inner wall of the pipe must be smaller than 90°. Otherwise, there is a possibility of the cutting rod causing a short circuit as previously pointed out. To smoothen the sliding contact of the cutting rod with the pipe interior, the cutting rod 18 may be curved, as illustrated in FIG. 6.

The foregoing embodiment has been described as employing a moving base 22 of the type which has the cutting rod 18 fastened thereto and which is adapted to be slid around a sliding bar 20. As illustrated in FIG. 7, the cutting rod 18 can be kept in contact under a fixed force with the inner wall of the pipe 1 by fastening the rotary shaft 17 directly to the supporting plate 27, pivotally attaching the cutting rod 18 to the rotary shaft by means of a pin 28 so as to enjoy freedom of rotation and rotating the pin 28 by some suitable means, such as an air motor or spring (not shown).

As described above, the cutting rod 18 has a construction such that the leading end thereof is always held in contact under a fixed force with the inner wall of the pipe without reference to the fusion which takes place on the cutting rod 18.

Said moving base 22 is further provided with a power source terminal 29 serving to supply to the cutting rod 18 the electricity required for the oxy-arc cutting operation and an oxygen feeding aperture 30 serving to deliver the oxygen which must be thrown out through the inner hole of the cutting rod.

To effect the desired cutting of the pipe by using the device having the construction described above, the device in its entirety is hung by the suspending arm 6 from a suitable means and lowered down the interior of the pipe 1 until the device reaches the position selected in advance for cutting. In this case, the entire device descends the interior of the pipe 1 very smoothly because the guide rollers 5a and 5b fixed at the upper and lower parts on the periphery thereof roll down the inner wall of the pipe while keeping rolling contact therewith.

After the device reaches the prescribed position, the compressed fluid is delivered from the upper chamber 9a of the cylinder 9 to set the piston 10 going down. Consequently, the claws are radially thrust out in the direction of the inner wall of the pipe and the claws are individually pressed against the inner wall, with the result that the device is fixed with reference to the pipe.

After the device is thus fixed, the moving base 22 is slid on the sliding bar 20 toward the inner wall of the pipe until the cutting rod is pressed with a fixed magnitude of strength against the inner wall of the pipe. Then, the potential is applied by the power source terminal 29 to the cutting rod to generate an arc between the cutting rod and the pipe. Further, oxygen is delivered through the oxygen supplying aperture 30 to be thrown out through the leading end of the cutting rod. As the steel of the pipe is oxidized with the oxygen, the cutting of the pipe begins to proceed from the inside. In this case, otherwise possible short circuit between the cutting rod and the pipe is prevented and the arc is produced stably because the cutting rod is covered with a layer of flux and further because the cutting rod is held at a constant force against the inner wall of the pipe at an angle of less than 90° relative to the inner wall. Even if foreign matter, such as grit, adheres to the inner wall of the pipe during the insertion of the device into the pipe interior and consequently prevents the axis of the rotary shaft from coinciding with the axis of the pipe, the removing base is slidably mounted on the sliding bar as described above and the cutting rod is consequently kept in contact at all times with the inner wall of the pipe. Thus, the arc is generated stably.

As the cutting of the pipe is started, the driving unit 14 is actuated to rotate the rotary shaft 17 through the medium of gears 15, 16, causing the cutting rod 18 fastened to the leading end of the rotary shaft 17 to be moved along the inner wall of the pipe 1.

The moving base 22 is automatically moved on the sliding bar 20 in proportion as the consumption of the cutting rod 18 proceeds, so that the leading end of the cutting rod 18 is kept at all times in contact with the inner wall of the pipe 1.

As the rotary shaft is rotated around its axis one complete circle, so the cutting rod is moved along the inner wall of the pipe one complete circle. Thus, the pipe is cut into two pieces.

When the rotary shaft 17 is rotated one complete circle and the cutting is completed consequently, the driving unit 14 for the rotary shaft is stopped and at the same time the operation of the oxy-arc cutting is discontinued, such as by means of a limit switch, for example.

The preceding embodiment has been described as involving use of only one cutting rod. If two cutting rods 18 are fastened to the rotary shaft 17 symmetrically with each other, as illustrated in FIG. 8(A) or 8(B), then complete cutting of a pipe can be attained by rotating the rotary shaft by 180°.

As is evident from the foregoing description, once the device is held immovable inside the pipe, the cutting rod is rotated inside the pipe with the leading end of the cutting rod kept in contact under a fixed force with the inner wall of the pipe. This contact and rotation of the rotary shaft can be effected by use of a rotary torque actuator, a spiral spring, a tensile mechanism resorting to attraction by a wire or a hydraulic mechanism, for example.

The embodiments given above have been described invariably as effecting the cutting on a pipe disposed vertically. With the device of the present invention, desired cutting can similarly be effected on a pipe disposed in an inclined position, because the guide rollers 5a and 5b disposed in the upper and lower parts of the cylinder 9 in the device enable the entire device to be smoothly moved inside the pipe. Even in the case of a pipe which is laid in a horizontal position, the device can readily be inserted into the pipe interior, fixed at the predetermined position and operated to effect the cutting.

As is clear from the description given above, the device for pipe cutting according to this invention is constructed of simple mechanisms so as to be inserted into the pipe interior and operated to cut the pipe from the inside at any desired position. Thus, the device is able to cut the pipe smoothly if the pipe is surrounded by soil or concrete. Further, the cutting of a pipe can be automated by carrying out the individual steps of operation, such as fixation of the device inside the pipe, the starting and stopping of the rotary shaft, the application of potential and the supply of oxygen by means of remote control or sequential signals. Also the cutting of a pipe can be carried out as effectively under water as in the atmosphere.

What is claimed is:

1. A device for cutting a pipe by the oxy-arc cutting process, which comprises, in combination,
    a cylinder internally incorporating a piston and downwardly extending into a circular skirt,
    a plurality of claws connected to the lower part of said piston and adapted to be radially thrust out in the direction of the inner wall of a pipe by the descent of said piston,
    a plurality of guide rollers radially protruding in the direction of the inner wall of the pipe, some of said guide rollers from adjacent the upper peripheral surface of said cylinder and the others from the peripheral surface of the downwardly extended skirt of said cylinder.
    said plurality of claws protruding at a level between the levels containing the upper and lower groups of guide rollers;
    a rotary shaft pierced axially through said cylinder and said piston, with one end of said rotary shaft protruding from the upper surface of said cylinder and provided with a driving unit for the rotary shaft,
    an oxy-arc cutting rod disposed at the other end of said rotary shaft by movable means that maintain the leading end of said oxy-arc cutting rod in contact under a fixed force with the inner wall of the pipe at a fixed angle less than 90°, and
    means for supplying said oxy-arc cutting rod with electric power and oxygen; whereby said movable means move to maintain said oxy-arc cutting rod in contact with the inner wall of the pipe as the oxy-arc cutting rod is consumed by the oxy-arc cutting process.

2. The device for cutting a pipe according to claim 1, wherein the plurality of claws remain in their retracted position inwardly of the guide rollers while the piston is in its raised position and said claws extrude from the guide rollers when the piston goes down.

3. The device for cutting a pipe according to claim 1, wherein the leading end of the cutting rod is moved along the inner wall of the pipe by the rotary shaft.

4. A device for cutting a pipe by the oxy-arc cutting process, which comprises, in combination,
    a cylinder internally incorporating a piston and downwardly extending into a circular skirt,
    means for fixing said cylinder within said pipe including, a plurality of claws connected to the lower part of said piston and adapted to be radially thrust out in the direction of the inner wall of a pipe by the descent of said piston, a plurality of guide rollers radially protruding in the direction of the inner wall of the pipe, some of said guide rollers from adjacent the upper peripheral surface of said cylinder and the others from the peripheral surface of the downwardly extended skirt of said cylinder, a rotary shaft pierced axially through said cylinder and said piston, with one end of said rotary shaft protruding from the upper surface of said cylinder and provided with a driving unit for the rotary shaft, an oxy-arc cutting rod disposed at the other end of said rotary shaft by movable means that maintain the leading end of said oxy-arc cutting rod in contact under a fixed force with the inner wall of the pipe at a fixed angle less than 90°, wherein the leading end of the oxy-arc cutting rod is moved along the inner wall of the pipe by the rotary shaft and the oxy-arc cutting rod is covered with a layer of flux and it is fastened to the rotary shaft in such a way that the oxy-arc cutting rod comes into contact with the inner wall of the pipe through the medium of said layer of flux and maintains contact with the inner wall of the pipe as the oxy-arc cutting rod is consumed by the oxy-arc cutting process, and means for supplying said oxy-arc cutting rod with electric power and oxygen.

5. The device for cutting a pipe according to claim 4, wherein two cutting rods are used.

6. The device for cutting a pipe according to claim 1, wherein the cylinder has additionally fastened thereto a suspending arm from which the cylinder is hung down so as to be lowered into the pipe interior.

* * * * *